United States Patent
Karppanen (10) Patent No.: US 10,706,488 B2
(45) Date of Patent: Jul. 7, 2020

(54) EMBEDDING DEBUGGING INFORMATION VIA WATERMARKS

(71) Applicant: Amazon Technologies, Inc., Reno, NV (US)

(72) Inventor: Jari Juhani Karppanen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 156 days.

(21) Appl. No.: 15/875,754

(22) Filed: Jan. 19, 2018

(65) Prior Publication Data

US 2018/0144432 A1     May 24, 2018

Related U.S. Application Data

(63) Continuation of application No. 14/970,131, filed on Dec. 15, 2015, now Pat. No. 9,875,515.

(51) Int. Cl.
*G06K 9/00* (2006.01)
*G06T 1/00* (2006.01)

(52) U.S. Cl.
CPC ...... *G06T 1/005* (2013.01); *G06T 2201/0051* (2013.01); *G06T 2201/0052* (2013.01)

(58) Field of Classification Search
None
See application file for complete search history.

(56) References Cited

U.S. PATENT DOCUMENTS

| | | | |
|---|---|---|---|
| 6,411,725 B1 * | 6/2002 | Rhoads | G06F 21/10 382/100 |
| 6,643,384 B1 | 11/2003 | Naito | |
| 6,889,211 B1 * | 5/2005 | Yoshiura | G06F 21/10 705/51 |
| 9,363,409 B2 | 6/2016 | Rhoads et al. | |
| 2001/0054149 A1 * | 12/2001 | Kawaguchi | G06T 1/0021 713/175 |
| 2001/0054150 A1 | 12/2001 | Levy | |
| 2002/0040347 A1 | 4/2002 | Murakami | |
| 2002/0083324 A1 * | 6/2002 | Hirai | G06F 21/10 713/176 |
| 2002/0112162 A1 * | 8/2002 | Cocotis | H04L 63/08 713/176 |
| 2002/0191810 A1 | 12/2002 | Fudge | |
| 2002/0199106 A1 * | 12/2002 | Hayashi | G06T 1/005 713/176 |

(Continued)

*Primary Examiner* — Shervin K Nakhjavan
(74) *Attorney, Agent, or Firm* — Hogan Lovells US LLP (57) ABSTRACT

Debugging information for content rendered for display on a client device can be included in one or more watermarks inserted into the content. Performance, state, configuration, debugging, and other information can be encoded into a watermark and placed in rendered content in such a way that the information is imperceptible to most users. When a user reports a potential issue or problem, the user (or another source) can provide a version of the image frame corresponding to the issue, which enables the watermark to be located and the data extracted. A checksum or other value can be used to ensure that a complete and valid watermark was obtained. The data extracted from the watermark can then be used to attempt to identify and/or diagnose the potential issue without having to have access to the client device or communication with the user.

18 Claims, 7 Drawing Sheets

(56) References Cited

U.S. PATENT DOCUMENTS

| | | | |
|---|---|---|---|
| 2003/0053653 A1 | 3/2003 | Rhoads | |
| 2004/0131184 A1 | 7/2004 | Wu et al. | |
| 2004/0145661 A1 | 7/2004 | Murakami | |
| 2004/0223612 A1 | 11/2004 | Kamijoh | |
| 2004/0230954 A1 | 11/2004 | Dandoy | |
| 2004/0264735 A1* | 12/2004 | Rhoads | G06K 7/1417 382/100 |
| 2005/0248668 A1 | 11/2005 | Machida | |
| 2006/0227968 A1* | 10/2006 | Chen | G10L 19/018 380/205 |
| 2006/0259774 A1 | 11/2006 | Swoboda | |
| 2008/0028474 A1 | 1/2008 | Horne et al. | |
| 2008/0037855 A1* | 2/2008 | Silverbrook | G06Q 10/087 382/135 |
| 2008/0065896 A1* | 3/2008 | Johnson | G06T 1/0021 713/176 |
| 2008/0256361 A1 | 10/2008 | Teuwen | |
| 2009/0070593 A1 | 3/2009 | Boshra | |
| 2009/0254752 A1 | 10/2009 | Johansson | |
| 2010/0142752 A1* | 6/2010 | Rhoads | G06T 1/0028 382/100 |
| 2011/0185179 A1 | 7/2011 | Swaminathan | |
| 2012/0308071 A1* | 12/2012 | Ramsdell | H04N 1/32144 382/100 |
| 2012/0317552 A1 | 12/2012 | Bates | |
| 2013/0117571 A1 | 5/2013 | Petrovic et al. | |
| 2013/0152210 A1* | 6/2013 | Petrovic | G06F 21/10 726/26 |
| 2013/0301872 A1* | 11/2013 | Flaharty | H04N 5/913 382/100 |
| 2014/0026195 A1 | 1/2014 | Marshall | |
| 2014/0050324 A1 | 2/2014 | Kamano et al. | |
| 2014/0157441 A1 | 6/2014 | Georgiev | |
| 2014/0195811 A1 | 7/2014 | Braams | |
| 2015/0063625 A1* | 3/2015 | Martin | H04N 1/32325 382/100 |
| 2015/0254435 A1 | 9/2015 | Fells | |
| 2016/0055607 A1 | 2/2016 | Petrovic | |
| 2016/0150297 A1 | 5/2016 | Petrovic et al. | |

* cited by examiner

EMBEDDING DEBUGGING INFORMATION VIA WATERMARKS

CROSS-REFERENCE TO RELATED APPLICATIONS

This is a continuation application of U.S. patent application Ser. No. 14/970,131, filed on Dec. 15, 2015, entitled "EMBEDDING DEBUGGING INFORMATION VIA WATERMARKS," which is hereby incorporated by reference in its entirety.

BACKGROUND

Users are increasingly utilizing electronic devices to perform various tasks. These tasks can be performed in various ways, such as by using Web content displayed through a Web browser or content accessed using an application (or "app") executing on a client device. Users using a variety of different applications accessing a variety of different content will occasionally experience issues with the intended functionality. A user can report these issues, but a developer will want to determine contextual information in an attempt to determine a potential cause of the reported issue. In some instances, this also involves attempting to recreate the issue. In order to perform these tasks, a developer needs to obtain the contextual information from the user or another source. Users may be unwilling to provide contextual information, or may not know how to provide the appropriate information. Further, various engines and protocols do not provide for the capturing of robust debugging information, particularly from client or third party devices.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to obtaining operational information in an electronic device. In particular, various embodiments provide for the obtaining of debugging information through the inclusion of watermarks in rendered content. Performance, state, configuration, debugging, and other information can be encoded into a watermark and placed in rendered content in such a way that the information is imperceptible to most users. When a user reports a potential issue or problem, the user (or another source) can provide an image frame corresponding to the issue, which enables the watermark to be located and the data extracted. A checksum or other value can be used to ensure that a complete and valid watermark was obtained. The data extracted from the watermark can then be used to attempt to identify and/or diagnose the potential issue.

Various other functions and advantages are described and suggested below as may be provided in accordance with the various embodiments.

FIG. 1 illustrates an example situation 100 in which a page of content 104 is displayed on a computing device 102. Although a portable computing device is illustrated, it should be understood that any appropriate device can be used to present content in accordance with the various embodiments, as may include notebook computers, personal data assistants, e-book readers, cellular phones, video gaming consoles or controllers, smart televisions, set top boxes, a wearable computer (e.g., a smart watch or glasses), and portable media players, among others. In this example, the content displayed includes image and text content, as may be rendered on the computing device 102 or by a remote rendering engine, among other such options. The content can be Web content displayed through a browser application, content rendered by an application from a content provider or third party application provider, among other types of content.

Figure 1A:
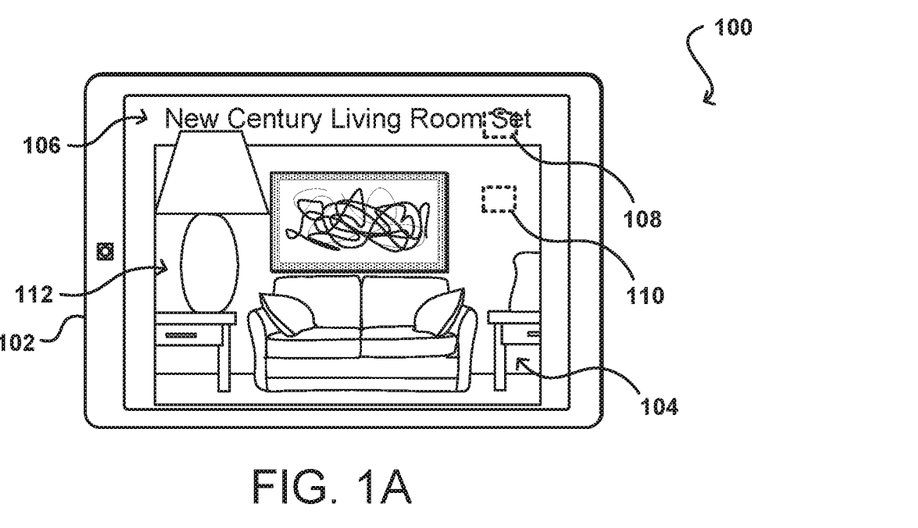
FIGS. 1A, 1B, 1C, 1D, and 1E illustrate example approaches to embedding information in an image through watermarking that can be utilized in accordance with various embodiments.

In this example, the displayed content relates to furniture placed in a virtual room that enables a user to view collections of furniture in realistic environments. There might be any of a number of issues with such a display or presentation of content, however. In this example, the size of a lamp 112 displayed in the image is too large relative to the other content displayed. Accordingly, a customer experiencing the issue might generate a notification to be sent to a provider of the content and/or application in order to report the alleged problem. An entity receiving the notification may then want to be able to determine sufficient information to identify the type of problem or issue that was alleged to have been experienced on the device. The entity might also attempt to determine contextual information in order for the entity to be able to recreate the situation and/or problem. This can include information such as the content being displayed, the display settings, information about the device used to display the content, a time at which the content was displayed, a frame number if the problem occurred with a specific frame or set of frames, or other such information that may be known to one of ordinary skill in the art for debugging applications or content that would be apparent in light of the teachings and suggestions contained herein.

Problems can arise, however, when the entity attempting to diagnose the problem is unable to obtain the appropriate information. For example, a rendering engine might have only limited capability with respect to the generating and/or outputting of metadata, state, or debugging data, among other such types of information. If a rendering engine is not able to fully utilize a component such as an embedded view component or sandboxed renderer process, for example, retrieving debugging data might require implementing an additional interface or performing security exceptions, which might not be available or may not be implemented as needed, such as where a software author using cloud-based rendering chooses not to implement any auxiliary interfaces. The choice to not implement such interfaces may be a valid choice due to the burden of implementing the interfaces as well as introducing security or other such issues. In some embodiments a debugging process might not be allowed to send debugging data during normal rendering due bandwidth or security constraints, among other such issues. It thus can be difficult for a developer to obtain debugging information such as program state information (i.e., the state of variables and calls made), timestamp information, subroutines executed, types or constants defined, frame information, processing data, sample data, failure occurrence record data, breakpoints met, and the like. The types and amount of information can further depend upon the complexity of the content or application, the type of issue experienced, and other such factors.

Accordingly, approaches in accordance with various embodiments attempt to provide for the availability of debugging information by embedding the debugging information in the content (e.g., image, video, or audio content) presented using a computing device. In particular, the debugging information can be inserted into an image frame as a watermark that is barely perceptible to the average user. In this way, the debugging information can be available regardless of the type of application or device used to display the content, and can avoid various bandwidth, security, and other such concerns mentioned elsewhere herein. A user experiencing a problem can provide a copy of the image with the notification, such as by capturing a screenshot or selecting an option that automatically captures and sends a copy of the image to a remote debugging service or other such location. In other embodiments, a debugging tool can analyze the image on the client device in order to extract the debugging information and then provide the debugging information to the debugging service. Various other approaches can be used as well as discussed and suggested elsewhere herein.

Various types of watermarks can be utilized in accordance with various embodiments. A digital watermark can be embedded in noise-tolerant content, such as an image, audio, or video content. Digital watermarks can be perceptible under certain conditions, such as under examination by a watermark extraction algorithm, but imperceptible under other conditions, such as upon viewing by a human user. A watermark can be added to an image in some embodiments by adjusting the values of certain pixels of the image by amounts determined by a particular encoding engine. The amount of adjusting should be such that the visible changes to the pixels are minimal, in order to reduce the impact and detectability by a user. Further, the encoding can be performed using pixel locations that are likely to be less perceptible to a user. In some embodiments, an encoding bit rate can be varied based on the underlying content and a rate of content change. For example, when scrolling down quickly, a higher bit rate can be used to encode more information into each frame, as human eyes are unable to focus and differentiate the "artificial noise" from faster moving/changing content. The visual complexity for choosing the amount of data to encode can be approximated by monitoring how much CPU time content rasterization requires and/or monitoring the kind of drawing instructions that were executed to generate a piece of content, such as a tile. Bitrate change can be gradual or "modulated" near tile boundaries, to avoid regular-shaped changes in noise patterns, which could be more easily seen by humans.

Figure 1B:
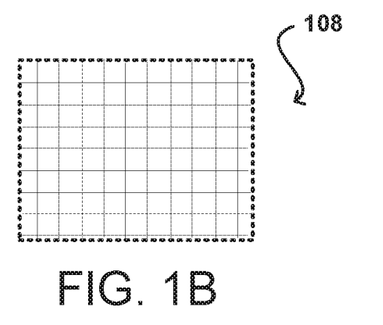
Figure 1C:
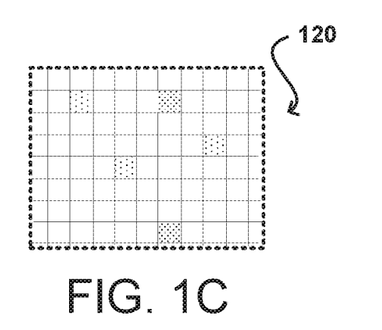
Figure 1D:
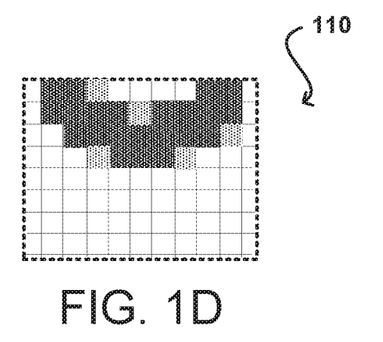
Figure 1E:
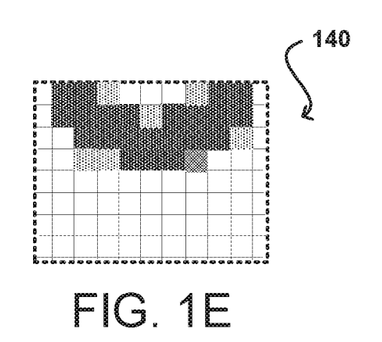

As an example, FIG. 1B illustrates a subset of pixels corresponding to a region 108 of the image in FIG. 1A that is substantially represented by a single color value or pixel value. If the encoding were to be placed using pixels in such a region, as illustrated in the encoded region 120 of FIG. 1C, the changes would be relatively noticeable to a user viewing the image content. A lower bit rate can be used to encode information in these areas, but it might be desirable in at least some embodiments to use portions of the image, where available, that allow for the use of higher bit rates. If the encoding were instead placed at locations such as the edges of letters or objects, which typically demonstrate some amount of blurring or antialiasing, the encoding may be less perceptible. For example, FIG. 1D illustrates an example region 110 from the image of FIG. 1A that includes a portion of a letter represented in the image. As illustrated, there are pixels of varying color around the edges of the letter. If the encoding is positioned in such locations, such as near the edges of the letter where some amount of color gradation is expected by the user, the user may not be able to perceive the difference. For example, FIG. 1E illustrates one such encoded region 140 where the encoding affects pixels near the edges of the letter. While a side by side comparison would enable a user to discern the differences, a user just viewing FIG. 1E by itself would generally not perceive that any encoding had taken place. While the encoding of the example of FIG. 1C might be perceptible to a user due in part to its placement, the placement in FIG. 1E can help to hide the encoding from a user. This is not necessarily to attempt to hide the presence of the debugging information from the user, but can instead enable the information to be provided without negatively impacting the user experience. For example, using the approach discussed with respect to FIG. 1E a user might not perceive any degradation or change in image quality through the inclusion of such information.

As mentioned, there can be various watermarking algorithms used to determine the encoding and placement of the debugging data in rendered image content. These can include, for example, quantization type watermarking algorithms, spread-spectrum watermarking algorithms, or amplitude modulation watermarking algorithms, among others. A watermarking process might utilize one or more different algorithms at different times, such as may depend at least in part upon a type of content, a type or amount of information to be embedded, a security level of the information, and the like. It at least some embodiments the watermark encoded into an image can include a checksum, or multiple checksums, as it can be difficult in at least some embodiments to determine the presence of a valid watermark, as well as to ensure that the entire watermark has been located. This is particularly true when the placement depends upon the location of objects represented in the content, and an image with a different portion, contrast, intensity, aspect ratio, resolution, or other such factor may result in an algorithm selecting different locations to place the encoding. For multiple checksums, one might be included for each record/chunk as opposed to the entire watermark, where one or more of the records with checksums can be used to verify all the data was decoded. Thus, if content is rendered with encoded information at determined locations using an algorithm, a screen shot from a user that includes additional or less information might result in that algorithm picking different places to look in the image. Thus, a checksum, hash, watermark length identifier, or other such data included in the watermark can be useful in ensuring that a valid and complete watermark has been identified. The data extracted can then be used to attempt to debug the problem, using any of a number of different debugging approaches as might be used for similar data obtained from conventional sources.

Figure 2:
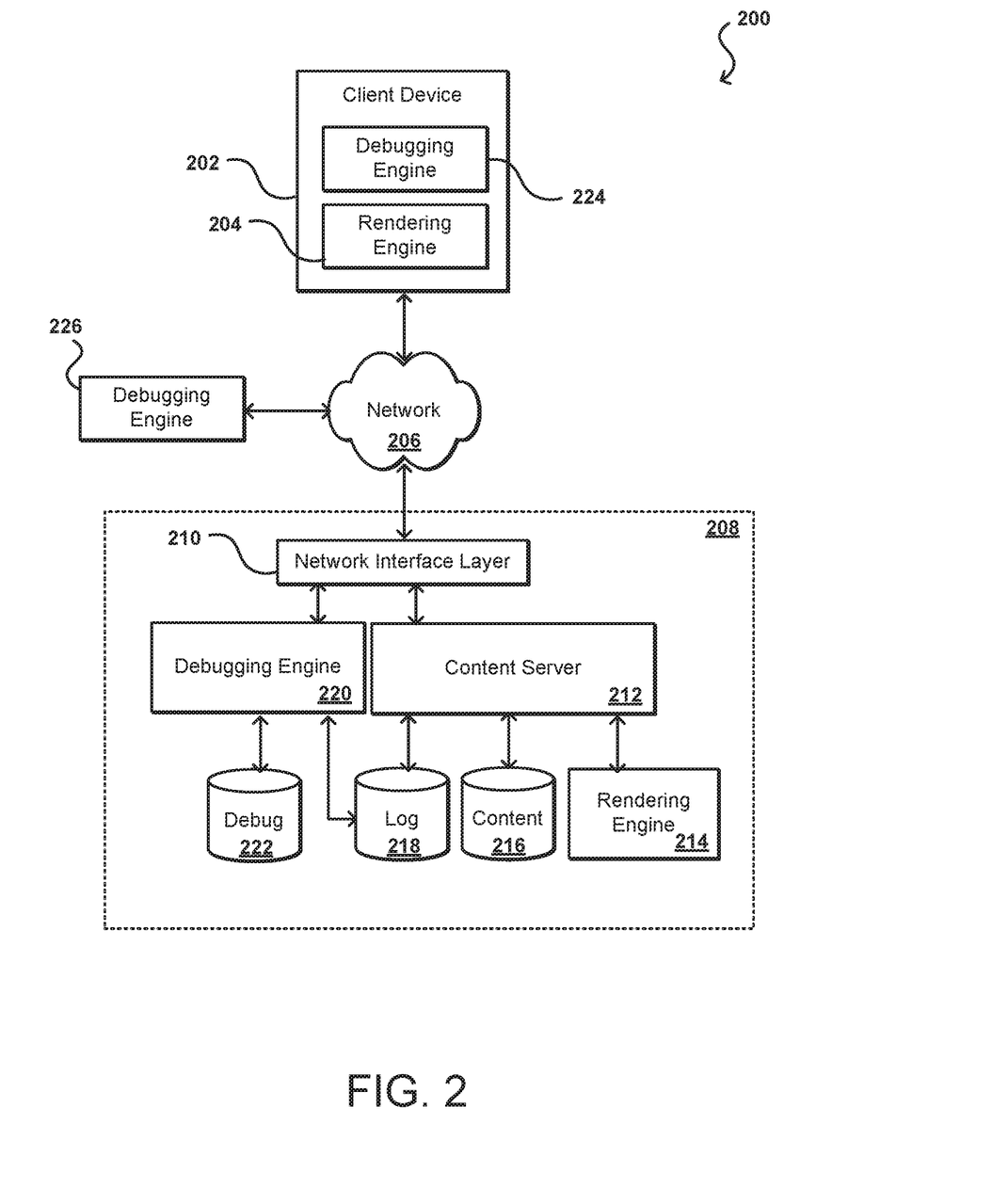
FIG. 2 illustrates an example environment for embedding debugging data in image content that can be utilized in accordance with various embodiments.

FIG. 2 illustrates an example environment 200 in which aspects of the various embodiments can be implemented. In this example, content is to be rendered on a client device 202. The content can originate from a content provider network 208, for example, as may be received over a least one network 206, such as the Internet, an intranet, a local area network, a cellular network, or another appropriate wired and/or wireless network. The content can be rendered using a rendering engine 204 on the client device and/or a rendering engine 214 in the resource provider environment 208, among other such options. In this example, at least some of the content can be pulled from a content repository 216 and rendered by a rendering engine 214 before being provided to the client device 202 by at least one content server 212. A request for the content can be received to a network interface layer 210, which can include one or more interfaces such as application programming interfaces (APIs) for receiving requests, as well as various other network components such as routers, load balancers, and the like. In at least some embodiments the content server 212 or another appropriate component can cause data to be written to at least one log 218, as may include information regarding the content served.

The content can be delivered across the at least one network 206 to the client device 202. As mentioned, at least some rendering can be performed by a rendering engine 204 on the client device. For example, a rendering engine for a Web browser might take markup language content such as HTML and formatting information to render Web content to be displayed on the client device 202 that can be formatted to fit the display and the current zoom level, etc. Various other components such as layout or placement engines can be used as well within the scope of the various embodiments. These engines can render data once the data is received, or may begin rendering as the data is received, among other such options. Further, a rendering engine might render only that portion of the content that will be visible, or may render some additional amount that can reduce the likelihood of chunking or delayed rendering in response to a navigation or zoom action, among other such possibilities.

As mentioned the client device can display the content, and if a user (or application or other source) detects a potential issue or problem with the content, software, or device, the user can cause the image information to be provided to the content provider network 208. As mentioned, this can be accomplished by a user capturing a screenshot of the content, taking a picture using a digital camera, or selecting an option in an executing application or console that causes image data to be captured, among other such options. In some embodiments the image can be processed on the client device 202, while in other embodiments the image can be provided to the content provider network 208, wherein the image can be directed to a debugging engine 220 or other such system or service. The debugging engine can have access (directly or indirectly) to a watermarking algorithm that can be used to analyze the image to attempt to locate and extract the watermark from the image. The content of the watermark can be analyzed to verify the accuracy, validity, and completeness of the watermark, such as by analyzing a checksum, hash, or length identifier of the watermark data and ensuring that the content of the watermark is as expected. If not, the image data can be re-analyzed using a different algorithm or different values for the same algorithm to attempt to determine the appropriate watermark. In some instances there might be multiple watermarks, with one being embedded in the original content or otherwise provided, which might prevent a single watermark from being accurately detected. In the event that a watermark cannot be properly identified, conventional approaches to locating debugging information can be used, among other such options. It should be mentioned that, as discussed elsewhere herein, a debugging engine 224 can also be included on the client device 202 in order to embed watermark data to content rendered and/or displayed on the client. In some embodiments a debugging engine 226 might be offered as a third party service and/or service outside the resource provider environment, whereby content from a provider can have debugging information added if the debugging service has access to the appropriate data to be included in the watermark.

If the watermark can be verified, the data included in the watermark can be analyzed and used to attempt to determine the source of the reported issue. As mentioned, this can include attempting to recreate the situation using the information provided. The watermark data, as discussed elsewhere herein, can include various types of data useful for debugging, as may include timestamp data, state data, frame data, configuration data, identifiers for external logs (additional logged information), serialized data structures that cause or are related to a failure, and the like. This information can be compared, using a debugging engine 220 or other such component or service, to information stored in a log data store 218 or other such location, which might contain additional information for the image frame. The amount of data that can be included in a watermark is limited, at least in keeping the perceptibility of the watermark low, such that additional information for the rendering might also be stored to a log data store. By using identifier information (frame, timestamp, client, etc.) from the watermark, the information from the watermark can be correlated with information in the log for purposes of obtaining additional information for debugging. Similarly, the debugging engine can use the debugging information from the watermark to check for similar data in a debugging data store 222, or other such location, do determine whether similar issues previously arose for similar circumstances, which can help point to a solution if one was previously determined. Once the appropriate information is obtained, any appropriate debugging process can be used to attempt to identify and rectify any potential issues, as would be apparent to one of ordinary skill in the art in light of the teachings and suggestions contained herein.

A rendering engine in some embodiments can employ an error-correction (ECC, parity bits), compression (such as Lempel-Ziv-Markov chain, arithmetic coding) and/or encryption scheme before watermarking, which can be separate from any such schemes in the watermarking algorithm itself. This can enable the use of multiple different available watermarking libraries and/or algorithms, and can help to secure any private user data or prevent malicious third parties from feeding incorrect information. An example rendering engine can provide a callback interface to the embedding application for adding additional debugging data, and another callback interface to the embedding application for notifying when it has added its changes to the output frame (i.e., finalized it), allowing a rendering engine to use application's output surface area. The latter callback can contain a frame buffer texture handle (or equivalent) as a parameter. When multiple layers of content are composited (i.e., flattened) into a final output image, a read-back phase may be used to retrieve the final frame texture and modify it directly. In some embodiments, a translucent layer containing the watermark data can be composited (i.e., merged) to the output frame. A watermarking algorithm might add actual noise to the image (not containing any data or containing dummy records) in some embodiments in order to make the output more pleasing to the human eye, such as when there's not enough data to cover the entire image area or tile. The same debugging data can also be repeated multiple times, as discussed elsewhere herein, to increase the chances of the data surviving in the event that some portion of the image is lost or otherwise not provided. In some embodiments there may be a queue of pending records, from which records can be encoded opportunistically to fill in any remaining unused watermark capacity after higher priority data has been encoded.

In some embodiments a rendering engine may keep collecting information (up to a limit, discarding lowest importance data) and keep a list of data records to be encoded, but only do the encoding when a screenshot function is activated, encoding as many as possible of the pending records into one frame. When an application using a rendering engine encounters a problem, such as violating an internal check for correctness, the rendering engine may temporarily use an algorithm with a higher bit rate and/or higher complexity than for normal output frames, in order to encode more information or increase the probability of the encoded data surviving any future quality degradation, possibly causing skipping small number of output frames.

Figure 3:
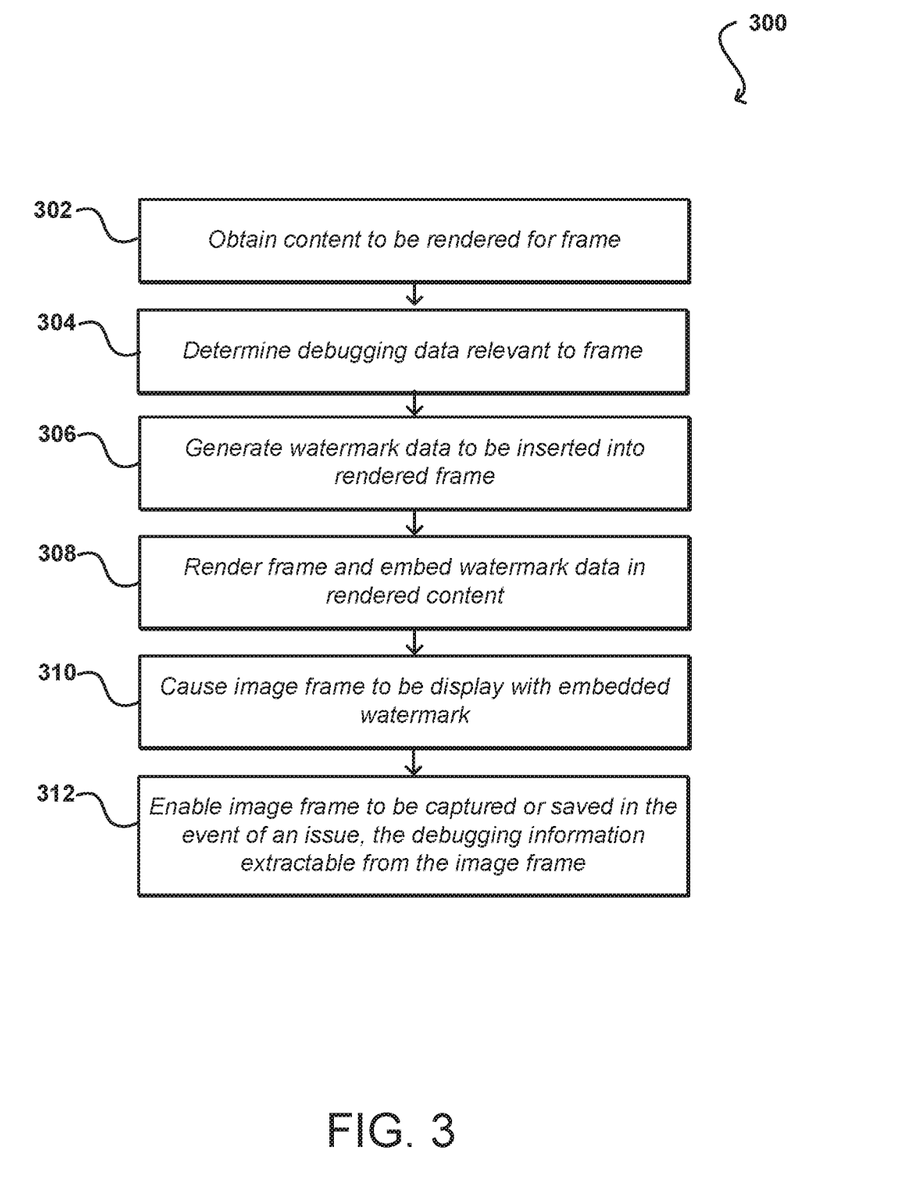
FIG. 3 illustrates an example process for embedding debugging data in image content that can be utilized in accordance with various embodiments.

FIG. 3 illustrates an example process 300 for embedding debugging data in a watermark that can be utilized in accordance with various embodiments. It should be understood that there can be additional, fewer, or alternative steps performed in similar or alternative orders, or in parallel, within the scope of the various embodiments unless otherwise stated. In this example, content to be rendered for a frame can be obtained 302 from an appropriate source, such as from a content provider network or third party provider. In some embodiments, the content can include webpage content (e.g., HTML) to be rendered that may include content from other providers, among other such content. In addition, debugging data relevant to a frame (or set of frames) of content to be rendered can be determined. This can include, for example, state data, frame number data, a time stamp, a client or customer identifier, and other such information. Watermark data that includes the debugging data and some verification data can be generated 306 that is to be inserted into the frame after, or at the time, the frame is rendered. As mentioned, the verification data can include a checksum, hash, or other mechanism that can be used to determine a completeness and validity of the watermark data. The watermark data can also be encoded such that the data can be distributed across an image in such a way that the data can be extracted but is generally imperceptible to a user viewing the image. The frame of content can then be rendered 308 and the watermark included. The watermark can be included at the time of rendering, or can be added as a separate step after the initial rendering, among other such options. As mentioned, portions of the watermark can be positioned near the edges of objects represented in the image that would typically demonstrate some amount of anti-aliasing, blending, blurring, or smoothing, such that a slight variation in pixel value will not be unexpected or even noticeable to a user. The watermark in at least some embodiments is encoded into the bitmap written into the frame buffer for the content to be displayed. The image can then be caused to be displayed 310, or otherwise presented, with the embedded watermark. If the watermark is instead in audio data, for example, then the audio with the watermark can be provided to be played through one or more speakers, among other such options. The capturing or saving of at least a portion of the rendered image is then enabled 312 in the event of an issue or potential problem, whereby the image can be provided to a debugging engine, service, or provider in order to enable that entity to extract the debugging information from the image, which can help to diagnose and/or re-create the identified issue.

Figure 4:
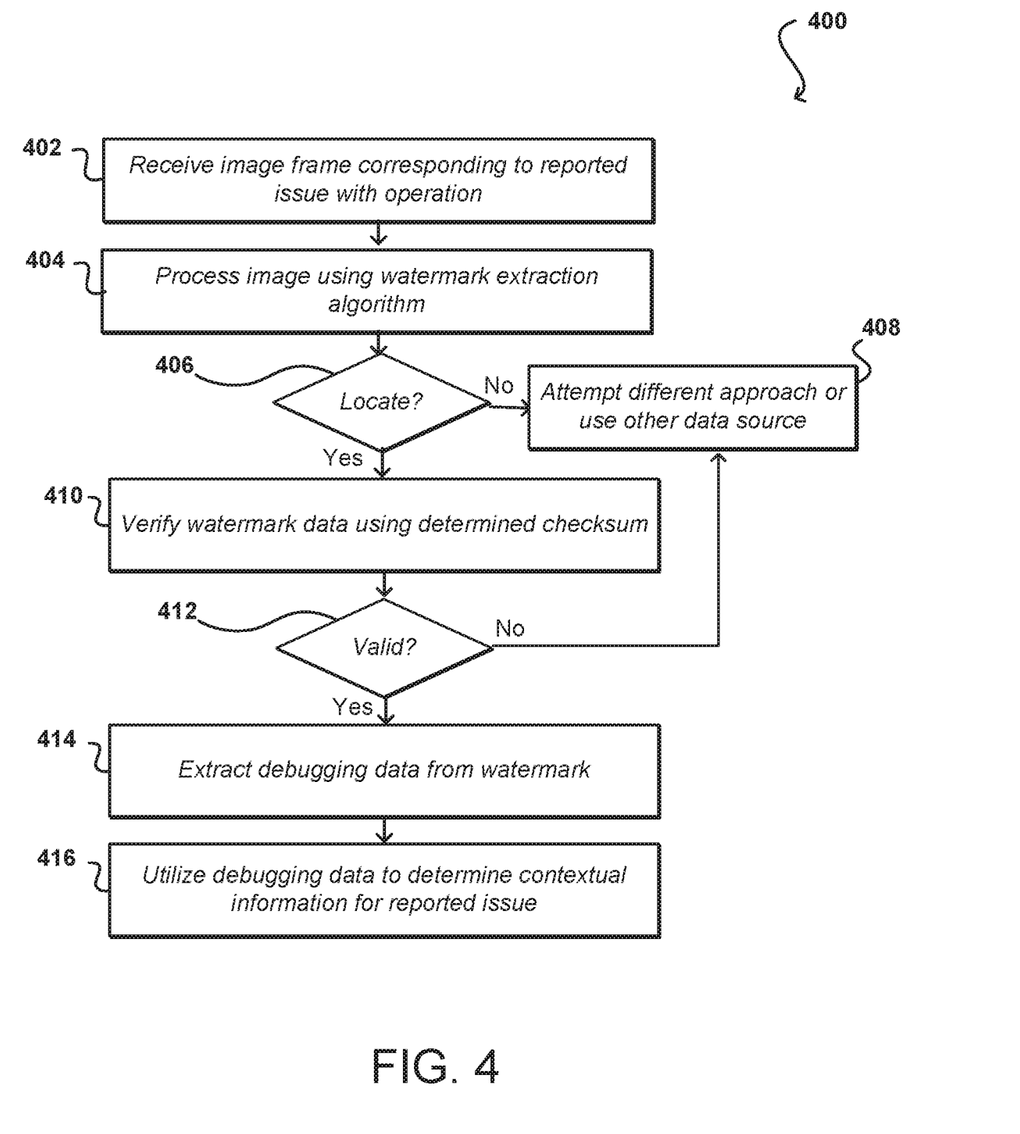
FIG. 4 illustrates an example process for extracting debugging data from image content that can be utilized in accordance with various embodiments.

FIG. 4 illustrates an example process 400 for extracting debugging data from a watermark that can be utilized in accordance with various embodiments. In this example, an image (or image frame) is received 402 that correspond to a reported issue with the content, the rendering of the content, an application or device rendering the content, etc. As mentioned, this image can be captured by a user using a screenshot function or digital camera, or can be captured by a console or application executing on the client device, among other such options. The image can be processed 404 with a watermark extraction algorithm that can analyze some, or all, of the image to attempt to recognize the watermark. Since this process will often be performed offline, the algorithm(s) can analyze the entire image using multiple passes with different parameters as needed to identify the watermark. If a watermark cannot be located 406, a different approach can be attempted 408, such as to adjust one or more search parameters or utilize a different extraction algorithm. Other data sources also can be used if a watermark cannot be located, such as those that would be used to obtain debugging data using conventional approaches.

Once located, the content of the watermark can be verified 410 using a checksum, hash, length value, or other parameter included in the watermark. The data from the watermark can also be checked to ensure that the data corresponds to a valid watermark, includes appropriate debugging data, etc. If the watermark is determined 412 to not be valid, another approach can be used as discussed above to attempt to locate a complete watermark or use other data sources, among other such options. If the watermark is determined to be complete and valid, the debugging data or other appropriate information can be extracted 414 from the watermark and utilized 416 to attempt to determine contextual information for the reported issue. As mentioned, this can include information such as a state of the device, a state of the content, a frame sequence number, a timestamp of the reported issue, performance data for the time of the issue, intentionally placed debugging data, a rendering time for the frame, a list of assumptions, a set of state flags, and other such information. In some embodiments, a debugging tool can process a series of images to attempt to determine commonalities among images, analyze trends, or generate statistics, among other such features. For example, statistics can be generated as to the frequency of types of watermarks, the frequency of invalid or incomplete watermarks detected, the percentage of images containing a certain flag or debugging data value, etc.

Figure 5:
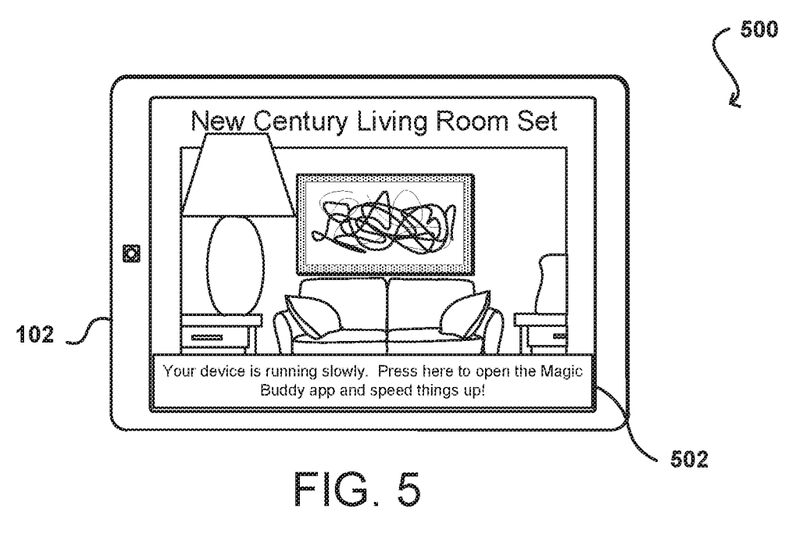
FIG. 5 illustrates an example display of content wherein a portion of a watermark may be occluded by content rendered from an embedded engine that can be processed in accordance with various embodiments.

An advantage to processing several images using a debugging tool or service is that incomplete information may be able to be obtained by utilizing information obtained from other images. For example, the display 500 of content in FIG. 5 illustrates the display of FIG. 1, except that here an embedded application or other source has caused other content to be displayed as an overlay 502 that obscures or occludes a portion of the displayed image. In such a situation, at least a portion of the watermark embedded in the image may not be able to be determined from an image or screenshot. If information from other images is available, which may also be sourced from content rendered for other clients, the information might be able to be completed or at least partially recovered in order to enable at least some of the debugging information to be determined for the corresponding situation.

Another advantage to embedding the debugging information in the image data is that a third party developer or content author can diagnose problems even if that party may not otherwise be able to obtain access to the appropriate data. For example, a user posting a screenshot of the issue on a social networking site can be sufficient for an entity to analyze the screenshot and determine debugging information for the issue, without having to obtain the information from the user in some other way, such as through the submission of log files or the implementation of a listener interface to collect data, among other such options. Such an approach also enables the party to debug the problem even if the identity of the poster is unknown or access is otherwise problematic. Another advantage is that performance can be diagnosed and issues debugged using the data without the third party developer or author even being aware of the inclusion of the data in some embodiments, and where such modification is permitted and authorized. In some embodiments, a web crawler can be used to "scrape" known discussion forums or support web sites to automatically identify any images containing watermarks, and retrieve production debugging data without end-users having to provide the images to the original software author.

Such an approach is also useful for developers of applications, or apps, that might be purchased through an application store provided by another provider. The app developer thus might have no direct relationship with the customer. The ability to embed debugging information in a watermark, however, enables the app developer to determine the debugging information as long as the appropriate watermarked portion is somehow available to the developer. In some embodiments multiple instances of a watermark might be placed in an image frame, enabling the discovery of debugging data even if only a portion of the frame is visible. In some embodiments, such as where there are multiple frames in a sequence, the watermark data might also be displayed over several frames such that a video clip would be necessary to obtain all the appropriate watermark data. The watermark data can also be split over audio, video, and image encoding in some embodiments. The watermark can include other information as well, such as state or content of a portion of a page that is not visible but currently rendered. If an example screen includes around two million pixels and each pixel in this example can accept 32 bits of information, then there are around 8 megabytes of data available in a single image frame. In such a frame, there can be tens of kilobytes of information added without becoming visible to the human eye using certain watermarking algorithms.

In some instances certain types of images might affect the quality of the encoding. For example, an image that is saved to a JPEG format or compressed might lose some detail from the encoding that might make the watermark data unusable. In some embodiments there might be different levels of encoding, some of which being more likely to survive such a change. For example, a limited amount of high priority information might be encoded using a level or type of encoding that is more likely to survive a change, while lower priority information might be encoded using an approach that may be higher frequency and allow for a greater amount of information, but might be more likely to disappear in the event that the image is modified in some way.

Figure 6:
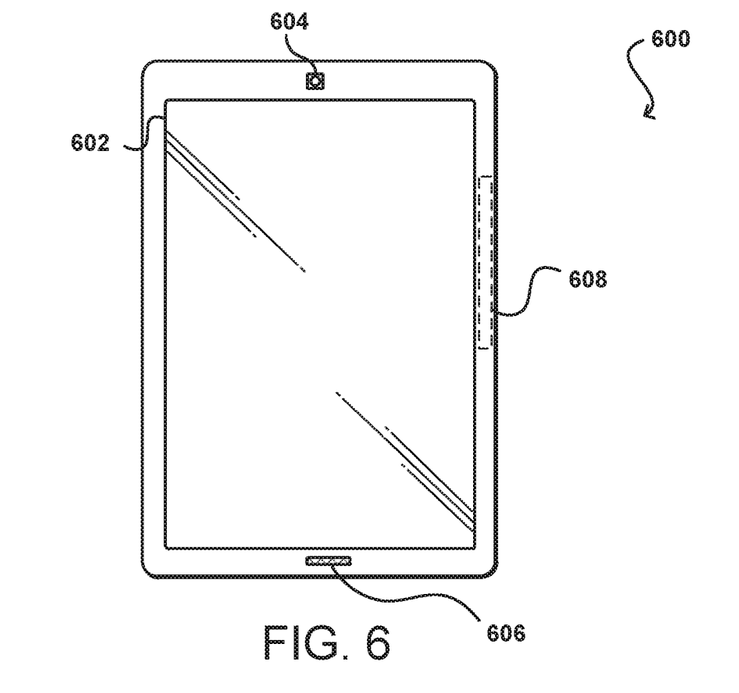
FIG. 6 illustrates an example device that can be used to implement aspects of the various embodiments.

FIG. 6 illustrates an example electronic user device 600 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 600 has a display screen 602 on the front side, which under normal operation will display information to a user facing the display screen (e.g., on the same side of the computing device as the display screen). The computing device in this example includes at least one camera 604 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 600 also includes at least one microphone 606 or other audio capture device capable of capturing audio data, such as words or commands spoken by a user of the device. In this example, a microphone 606 is placed on the same side of the device as the display screen 602, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 600 also includes at least one orientation sensor 608, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination.

As should be understood, the algorithms or mechanisms used for determining relative position, orientation, and/or movement can depend at least in part upon the selection of elements available to the device.

Figure 7:
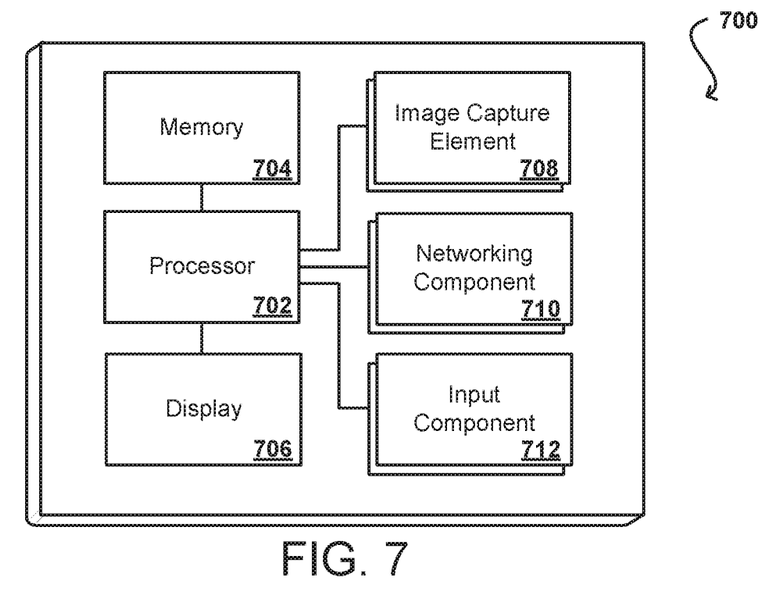
FIG. 7 illustrates example components of a client device such as that illustrated in FIG. 6.

FIG. 7 illustrates a logical arrangement of a set of general components of an example computing device 700 such as the device 600 described with respect to FIG. 6. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one image capture element 708 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component, such as a mono or stereo microphone or microphone array, operable to capture audio information from at least one primary direction. A microphone can be a uni- or omni-directional microphone as known for such devices.

In some embodiments, the computing device 700 of FIG. 7 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input component 712 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 700 also can include at least one orientation or motion sensor or component 710. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

As an example, a computing device such as that described with respect to FIG. 6 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 8:
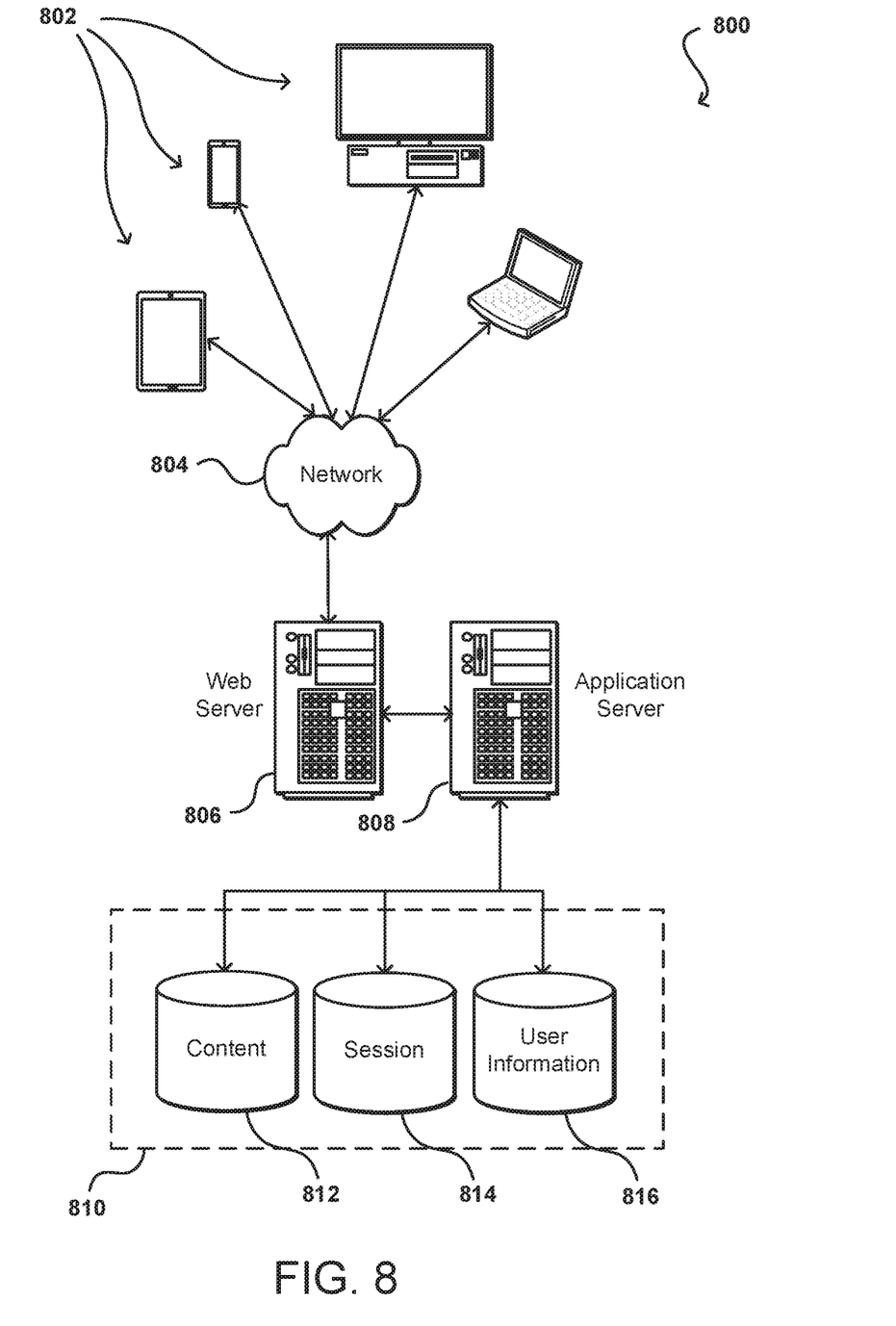
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 802. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including non-transitory computer-readable storage media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
embedding debugging data into a first watermark;
analyzing a first image frame representing rendered content on a client device;
identifying first watermark data represented in the first image frame, the first watermark data corresponding to at least a first portion of the first watermark containing debugging data;
embedding the debugging data into a second watermark;
positioning the second watermark in a different location than the first watermark;
analyzing a second image frame representing the rendered content;
identifying second watermark data represented in the second image frame, the second watermark data corresponding to at least a first portion of the second watermark containing debugging data; and
utilizing the debugging data from the first watermark and the second watermark to attempt to determine a cause of an issue with the rendered content.

2. The computer-implemented method of claim 1, further comprising:
causing the debugging data to be encoded at pixel locations proximate edges of objects represented in the rendered content.

3. The computer-implemented method of claim 1, further comprising:
determining at least one parameter from the watermark corresponding to a checksum, a hash, or a length identifier; and
verifying the watermark data using the at least one parameter.

4. The computer-implemented method of claim 1, further comprising:
storing additional debugging data to a log data store;
correlating the additional data to identifier information from the watermark; and
accessing the log data store to obtain the additional debugging data.

5. The computer-implemented method of claim 1, further comprising:
determining a quality associated with an image file comprising the first and second image frames;
determining the quality is below a threshold amount, the threshold indicating where data is lost; and
encoding at least a portion of the debugging data at a different encoding level to prevent data loss.

6. A computer-implemented method, comprising:
obtaining content for rendering on a client device;
determining debugging data relevant to the content;
determining verification data relevant to the content or client device;
generating watermark data including at least the debugging data and the verification data;
encoding first watermark data into a first image frame of the content;
encoding second watermark data into a second image frame of the content;
receiving the first image frame from the client device, the first image frame representative of content rendered on the client device;
locating watermark data within the first image frame;
determining the watermark data is incomplete;
evaluating the second image frame from the user device, the second image frame representative of content rendered on the client device; and
extracting the watermark data from a different location within the second image frame.

7. The computer-implemented method of claim 6, further comprising:
providing the content for the presentation via the client device.

8. The computer-implemented method of claim 6, further comprising:
determining at least one parameter from the watermark data corresponding to a checksum, a hash, or a length identifier; and
verifying the watermark data using the at least one parameter.

9. The computer-implemented method of claim 6, wherein the debugging data includes at least one of state information, frame information, timestamp information, content selection information, content layout information, user information, application information, rendering time data, processing data, sample data, failure occurrence record data, or breakpoint information.

10. The computer-implemented method of claim 6, wherein encoding the watermark data comprises using at least one of a quantization type watermarking algorithm, a spread-spectrum watermarking algorithm, or an amplitude modulation watermarking algorithm.

11. The computer-implemented method of claim 6, further comprising:
encoding a first portion of the watermark data into the content using a first watermarking algorithm and a second portion of the watermark data into the content using a second watermarking algorithm.

12. The computer-implemented method of claim 6, further comprising:
receiving a notification indicating a potential issue with a presentation of the content via the client device;
extracting the watermark data from the content; and
utilizing the debugging data, contained within the watermark data, to attempt to determine a cause of the potential issue.

13. The computer-implemented method of claim 6, wherein the content is rendered content comprising an image frame, the computer-implemented method further comprising:
receiving the image frame captured from the client device, the image frame being captured as displayed on the client device;
identifying the watermark data from the image frame; and
verifying the content of the watermark data.

14. A system, comprising:
at least one processor; and
memory including instructions that, when executed by the at least one processor, cause the system to:
obtain content for rendering on a client device;
determine debugging data relevant to the content;
determine verification data relevant to the content or client device;
generate watermark data including at least the debugging data and the verification data;
encode first watermark data into a first image frame of the content;
encode second watermark data into a second image frame of the content;
receiving the first image frame from the user device, the first image frame representative of content rendered on the client device;
locating watermark data within the first image frame;
determining the watermark data is incomplete;
evaluating the second image frame from the user device, the second image frame representative of content rendered on the client device; and
extracting the watermark data from a different location within the second image frame.

15. The system of claim 14, wherein the instructions when executed further cause the system to:
encode a first portion of the watermark data into the content using a first watermarking algorithm and a second portion of the watermark data into the content using a second watermarking algorithm.

16. The system of claim 14, wherein the instructions when executed further cause the system to:
determine at least one parameter from the watermark data corresponding to a checksum, a hash, or a length identifier; and
verify the watermark data using the at least one parameter.

17. The system of claim 14, wherein the instructions when executed further cause the system to:
receiving a notification indicating a potential issue with a presentation of the content via the client device;
extracting the watermark data from the content; and
utilizing the debugging data, contained within the watermark data, to attempt to determine a cause of the potential issue.

18. The system of claim 14, wherein the instructions when executed further cause the system to:
store additional debugging data in a log data store;
correlate the additional data to the verification data from the watermark; and
access the log data store to obtain the additional debugging data.

* * * * *